United States Patent
Chiu et al.

(10) Patent No.: US 9,158,406 B2
(45) Date of Patent: Oct. 13, 2015

(54) IN-CELL TOUCH DISPLAY PANEL

(71) Applicant: Chunghwa Picture Tubes, LTD., Taoyuan (TW)

(72) Inventors: Wei-Yen Chiu, Taoyuan County (TW); Chi-Liang Kuo, Taoyuan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 46 days.

(21) Appl. No.: 14/023,480

(22) Filed: Sep. 11, 2013

(65) Prior Publication Data
US 2015/0022484 A1 Jan. 22, 2015

(30) Foreign Application Priority Data
Jul. 17, 2013 (TW) .............................. 102125588 A

(51) Int. Cl.
G06F 3/041 (2006.01)
G06F 3/044 (2006.01)

(52) U.S. Cl.
CPC .............. *G06F 3/0412* (2013.01); *G06F 3/044* (2013.01)

(58) Field of Classification Search
CPC ....... G06F 3/0412; G06F 3/044; G06F 3/041; G02F 1/13338; G02F 1/1343; G02F 1/13624; G02F 1/1368
USPC .................................................. 345/173–174
See application file for complete search history.

(56) References Cited

U.S. PATENT DOCUMENTS

2011/0261293 A1* 10/2011 Kimura ............................. 349/74
2012/0112193 A1* 5/2012 Chiu et al. ....................... 257/59
2014/0111710 A1* 4/2014 Yang et al. ....................... 349/12
2014/0160041 A1* 6/2014 Kim et al. ...................... 345/173
2015/0002421 A1* 1/2015 Kim et al. ...................... 345/173

FOREIGN PATENT DOCUMENTS

| CN | 101498851 | | 8/2009 |
| CN | 102937853 A | * | 2/2013 |
| CN | 202887154 | | 4/2013 |
| TW | 201135311 | | 10/2011 |

OTHER PUBLICATIONS

"Office Action of Taiwan Counterpart Application," issued on May 27, 2015, p. 1-p. 8.

* cited by examiner

*Primary Examiner* — Lun-Yi Lao
*Assistant Examiner* — Elliott Deaderick
(74) *Attorney, Agent, or Firm* — Jianq Chyun IP Office

(57) ABSTRACT

An in-cell touch display panel includes an active device array substrate, an opposite substrate and a display medium layer. The active device array substrate includes a substrate, a plurality of active devices, a plurality of pixel electrodes, a plurality of common electrodes, a plurality of data signal lines and a plurality of switches. The pixel electrodes are respectively electrically connected to the corresponding active devices. The common electrodes are arranged into a plurality of common electrode series, wherein every two or more common electrode series are connected to each other to form a first touch electrode. The data signal lines are respectively coupled to the pixel electrodes through the corresponding active devices. Every two or more of the data signal lines are electrically connected to one of the switches, wherein the pixel electrodes and the data signal lines coupled to a same switch together form a second touch electrode.

10 Claims, 6 Drawing Sheets

IN-CELL TOUCH DISPLAY PANEL

CROSS-REFERENCE TO RELATED APPLICATION

This application claims the priority benefit of Taiwan application serial no. 102125588, filed on Jul. 17, 2013. The entirety of the above-mentioned patent application is hereby incorporated by reference herein and made a part of this specification.

BACKGROUND OF THE INVENTION

1. Field of the Invention

The invention generally relates to a display panel, and more particularly, to an in-cell touch display panel.

2. Description of Related Art

A touch panel can be roughly divided into an on-cell touch display panel, an integrated touch display panel and an in-cell touch display panel according to the disposing layout of the touch panel and the display panel. For the on-cell touch display panel, the touch components are usually fabricated on a substrate to form a touch panel, followed by adhering the touch panel onto the outer surface of the display panel. For the integrated touch display panel, the touch components are integrated onto the display panel. For the in-cell touch display panel, the touch components are directly integrated inside the display panel. Compared to the on-cell touch display panel, the integrated touch display panel and the in-cell touch display panel are quite suitable for thinning and lightening a display.

Regardless the on-cell touch display panel, the integrated touch display panel or the in-cell touch display panel, in order to form a touch display panel, it must additionally conduct several photomask processes under the original touch panel architecture to finish the fabrication of the touch components, i.e., a touch display panel requires considerable processes to be finished.

SUMMARY OF THE INVENTION

Accordingly, the invention is directed to an in-cell touch display panel configured to integrate touch components into the fabrication of a display panel and to achieve touching and displaying functions through time division driving.

An in-cell touch display panel of the invention includes an active device array substrate, an opposite substrate and a display medium layer. The active device array substrate includes a substrate, a plurality of active devices, a plurality of pixel electrodes, a plurality of common electrodes, a plurality of data signal lines and a plurality of switches. The substrate has a display region and a peripheral region adjacent to the display region. The active devices are arranged in an array in the display region. The pixel electrodes are located in the display region and respectively electrically connected to the corresponding active devices. The common electrodes are located in the display region and are respectively corresponding to the pixel electrodes, in which the common electrodes are arranged into a plurality of common electrode series and each of the common electrode series extends along a first direction, in which every two or more common electrode series are connected to each other to form a first touch electrode so that all the common electrodes of the active device array substrate form a plurality of first touch electrodes sequentially arranged along a second direction. The data signal lines are located in the display region and respectively coupled to the pixel electrodes through the corresponding active devices. Every two or more of the data signal lines are electrically connected to one of the switches, the pixel electrodes and the data signal lines coupled to a same switch together form a second touch electrode to make all the data signal lines and all the pixel electrodes of the active device array substrate folin a plurality of second touch electrodes arranged along the first direction. The opposite substrate is opposite to the active device array substrate. The display medium layer is disposed between the active device array substrate and the opposite substrate.

A method of driving the in-cell touch display panel of the invention includes following steps: first, independently driving each of the data signal lines in a display cycle; next, sequentially driving the second touch electrodes in a touching cycle, in which when each of the second touch electrodes is driven, all the data signal lines corresponding to each of the second touch electrodes are simultaneously driven, wherein the display cycle and the touching cycle are not overlapped with each other.

Based on the description above, when the in-cell touch display panel of the invention is in the display cycle, each of the data signal lines is independently enabled so that the common electrodes and the pixel electrodes drive the display medium layer to realize the general displaying function; in the touching cycle, the data signal lines connected to the same switch are simultaneously enabled so that the pixel electrodes and the data signal lines connected to the same switch together form the first touch electrode. In other words, the pixel electrodes can realize the touching function through the designs of the data signal lines and the switches.

In order to make the features and advantages of the present invention more comprehensible, the present invention is further described in detail in the following with reference to the embodiments and the accompanying drawings.

DESCRIPTION OF THE EMBODIMENTS

Figure 1:
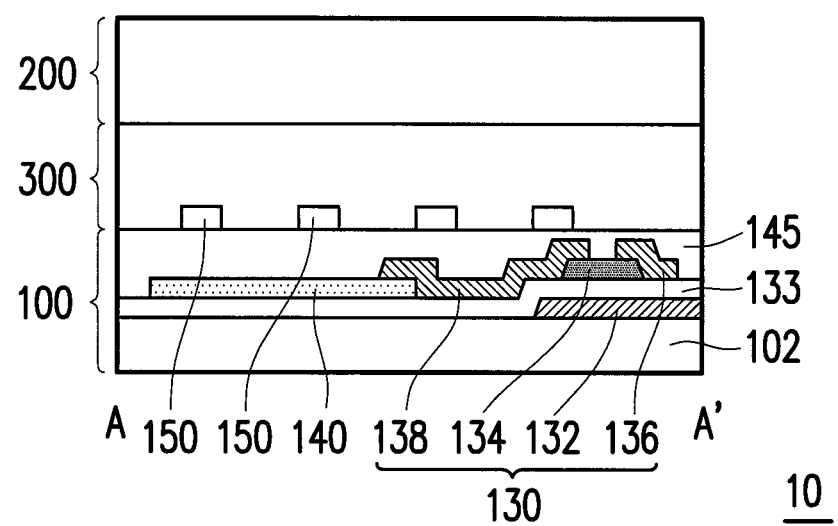
FIG. 1 is a cross-sectional diagram of an in-cell touch display panel according to an embodiment of the invention.

FIG. 1 is a cross-sectional diagram of an in-cell touch display panel according to an embodiment of the invention. Referring to FIG. 1, an in-cell touch display panel 10 of the invention includes an active device array substrate 100, an opposite substrate 200 and a display medium layer 300. The opposite substrate 200 is opposite to the active device array substrate 100 and the display medium layer 300 is disposed between the active device array substrate 100 and the opposite substrate 200. In the embodiment, the opposite substrate 200 is, for example, a color filter substrate having a color filter layer and a black matrix layer. The display medium layer 300 is, for example, a liquid crystal molecules layer, which the invention is not limited to.

Figure 2:
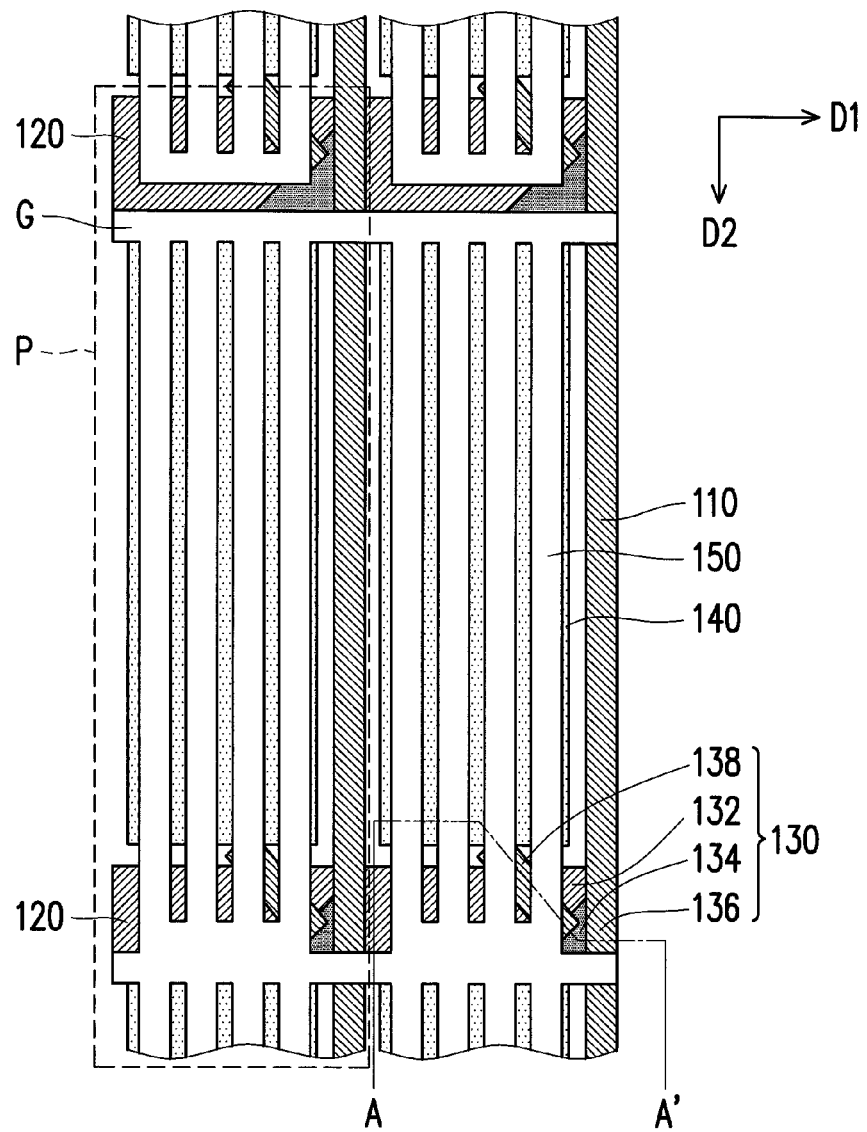
FIG. 2 is a top-view diagram of an active device array substrate according to an embodiment of the invention.
Figures 3A, 3B, 3C, 3D, 3E:
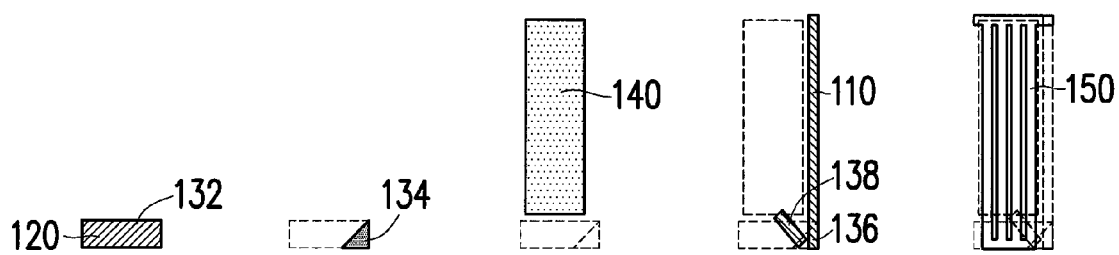
FIGS. 3A-3E are schematic layout diagram of all the parts in FIG. 2.
Figure 5:
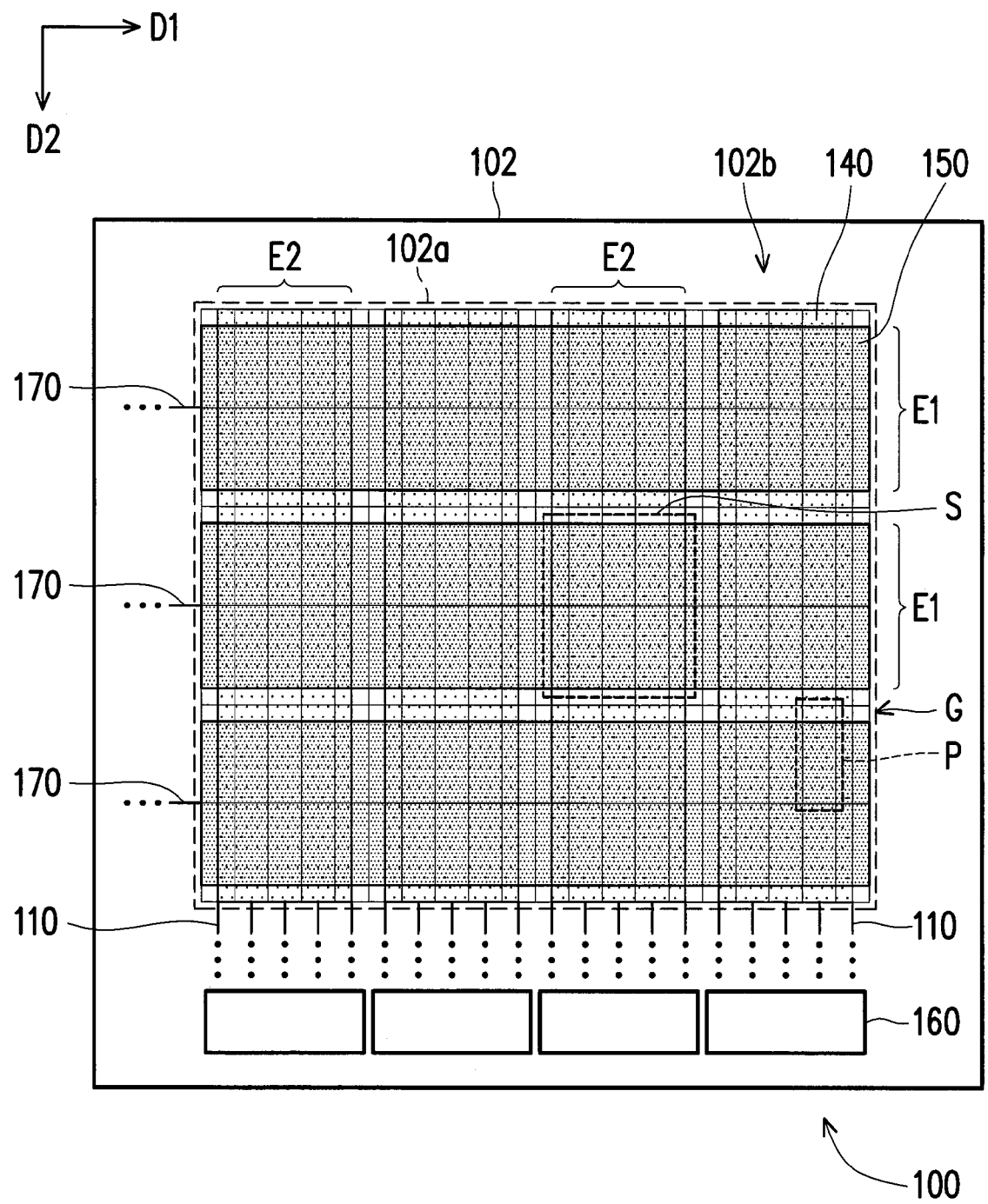
FIG. 5 is a top-view diagram of an active device array substrate according to an embodiment of the invention.

FIG. 2 is a top-view diagram of an active device array substrate according to an embodiment of the invention and FIGS. 3A-3E are schematic layout diagram of all the parts in FIG. 2. FIG. 1 is a cross-sectional view of the active device array substrate 100 along a section line A-A' depicted in FIG. 1. Referring to FIGS. 1, 2 and 3A-3E. The active device array substrate 100 includes a substrate 102, a plurality of data signal lines 110 and a plurality of scan lines 120. The substrate 102 has a display region 102a and a peripheral region 102b adjacent to the display region 102a (as shown in FIG. 5). Each of the scan lines 120 is disposed on the substrate 102 and extends along a first direction D1, and each of the data signal lines 110 is disposed on the substrate 102 and extends along a second direction D2. In the embodiment, preferably, the first direction D1 is perpendicular to the second direction D2, which the invention is not limited to.

The scan lines 120 and the data signal lines 110 are disposed alternately so as to define a plurality of sub-pixel regions arranged in an array in the display region 102a of the substrate 102. Each of the sub-pixel regions has a sub-pixel unit therein. In more details, the sub-pixel unit includes an active device 130, a pixel electrode 140 and a common electrode 150. The active device 130 is electrically connected to one of the scan lines 120 and one of the data signal lines 110. The pixel electrode 140 is, for example, electrically connected to one of the active devices 130. The common electrode 150 is disposed over the pixel electrode 140 and insulated from the pixel electrode 140.

The active device 130 includes a gate 132, a channel layer 134, a source 136 and a drain 138. The active devices 130 are arranged in the display region 102a in the array. The gate 132 is disposed on the substrate 102. A gate insulation layer 133 covers the gate 132 and the substrate 102. The channel layer 134 is disposed on the gate insulation layer 133 over the gate 132. The source 136 and the drain 138 are separated from each other and respectively cover partial areas of the channel layer 134. The active device 130 is connected to the data signal line 110 through the source 136 and is connected to the scan line 120 through the gate 132. The active device 130 in the embodiment is, for example, a bottom gate type thin film transistor; in other embodiments, the active device 130 can be a top gate type thin film transistor, which the invention is not limited to.

The pixel electrode 140 is electrically connected to the drain 138 of the active device 130. Specifically, the pixel electrode 140 can be fabricated on the gate insulation layer 133, followed by fabricating the drain 138 and making the drain 138 cover the pixel electrode 140. In other words, the drain 138 can directly contact the pixel electrode 140 to make them electrically connected to each other. When the active device 130 is turn on, the signal of the data signal line 110 can be transmitted to the pixel electrode 140 through the active device 130 so as to drive the pixel electrode 140. The pixel electrodes 140 in the same column arranged along the second direction D2 are coupled to the same data signal line 110 so that the pixel electrodes 140 in the same column are driven by the same data signal line 110. Each of the data signal lines 110 extends to the peripheral region 102b from the display region 102a and electrically connected to a switch 160.

Figure 4:
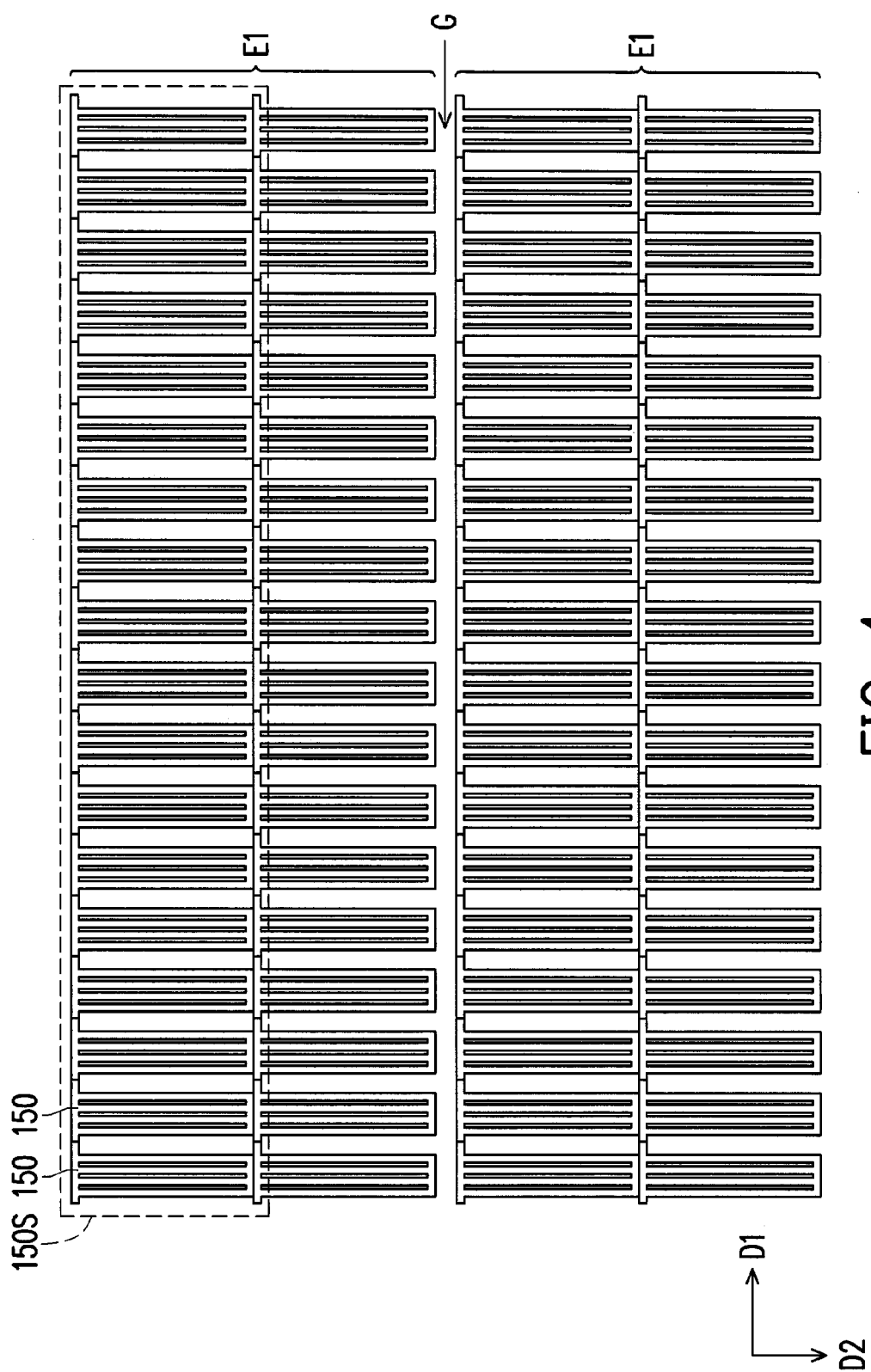
FIG. 4 is a top-view diagram of the common electrodes according to an embodiment of the invention.

FIG. 4 is a top-view diagram of the common electrodes according to an embodiment of the invention. Referring to FIGS. 1, 2 and 4, in every sub-pixel unit, a common electrode 150 and a pixel electrode 140 are correspondingly disposed. An insulation layer 145 is disposed between the common electrode 150 and the pixel electrode 140 to make them insulated from each other, as shown in FIG. 1. In the embodiment, the pixel electrode 140 is fabricated, followed by fabricating the common electrode 150, so that the common electrode 150 is located above the pixel electrode 140, in which the pixel electrodes 140 at the lower position has a continuous pattern without slit, while the common electrodes 150 has a pattern with multiple slits. Since the pixel electrodes 140 and the common electrodes 150 are disposed on the same substrate and located at the same side of the display medium layer 300, a lateral electrical field can be formed between the common electrodes 150 and the pixel electrodes 140 to drive the display medium in the display medium layer 300.

In other embodiments, it can be upside down that the common electrode 150 is fabricated first, followed by fabricating the pixel electrode 140 so as to form the pixel electrode 140 located above the common electrode 150. At the time, the common electrodes 150 at the upper position have a continuous pattern without slit, while the pixel electrodes 140 have a pattern with multiple slits. In the same way, since the pixel electrodes 140 and the common electrodes 150 are disposed on the same substrate and located at the same side of the display medium layer 300, a lateral electrical field can be formed between the common electrodes 150 and the pixel electrodes 140 to drive the display medium in the display medium layer 300.

As shown by FIG. 4, the common electrodes 150 are arranged to form a plurality of common electrode series 150S, and the common electrode series 150S are arranged along the second direction D2, wherein each of the common electrode series 150S extends along the first direction D1. Moreover, every two or more common electrode series 150S are connected together to form a first touch electrode E1, and the first touch electrodes E1 are separated from each other by a gap G. The first touch electrodes El are arranged along the second direction D2, and each of first touch electrodes E1 extends along the first direction D1. In short, all the common electrodes 150 of the embodiment form the plurality of the first touch electrodes E1.

FIG. 5 is a top-view diagram of an active device array substrate according to an embodiment of the invention. FIG. 5 only schematically illustrates the layout of the pixel electrodes 140 and the common electrodes 150, not showing the details of the part shapes and the disposing thereof. A partial area P in FIG. 5 can refer the partial area P of FIG. 2, wherein FIG. 2 has more details to show the part shapes and the disposing thereof.

Referring to FIG. 5, the plurality of first touch electrodes E1 are disposed in the display region 102a of the substrate 102, while the plurality of common signal lines 170 are disposed in the peripheral region 102b to be electrically connected to the corresponding first touch electrodes E1 respectively. The common signal lines 170 transmit the signals to the corresponding first touch electrodes E1.

In the embodiment, several adjacent data signal lines 110 are electrically connected to the same switch 160. At the time, the data signal lines 110 and the pixel electrodes 140 coupled to the data signal lines 110 form one of second touch electrodes E2 electrically connected to the same switch 160. Thus, the pixel electrodes 140 and the data signal lines 110 of the embodiment form the plurality of second touch electrodes E2 arranged along the first direction D1, and each of the second touch electrodes E2 extends along the second direction D2. In the embodiment, as an example, five adjacent data signal lines 110 are electrically connected to the same switch 160, which the invention is not limited to. People skilled in the art can adjust the number of the data signal lines 110 connected to the same switch 160 according to the design requirement.

The switch 160 is, for example, a thin film transistor or a circuit designed to have function of switching circuit. The switch 160 can be disposed in the peripheral region 102b of the substrate 102 and can be integrated into the fabrication of a driving chip, wherein the driving chip can be bonded on the substrate 102 or the driving chip can be electrically connected to the data signal lines 110 through a flexible printed circuit board. In other words, the invention does not limit the actual disposing position of the switch 160. Once the data signal lines 110 can be electrically connected to the corresponding switches 160, it can realize the design of the invention.

As shown by FIG. 5, the active device array substrate 100 includes a plurality of first touch electrodes E1 composed of the common electrodes 150 and a plurality of second touch electrodes E2 composed of the pixel electrodes 140 and the data signal lines 110. The first touch electrodes E1 extend along the first direction D1 and the second touch electrodes E2 extend along the second direction D2. The first touch electrodes E1 and the second touch electrodes E2 are alternately disposed and form a plurality of sensing areas S. In an embodiment, for each of the first touch electrodes E1 and each of the second touch electrodes E2, the sensor pitches thereof are respectively 4.5 mm-5.5 mm or so. The size of the sensing area S is a square of 4.5 mm-5.5 mm or so. However, the values are exemplarily for depiction purpose only, not to limit the invention and the people skilled in the art can adjust the values according to the design requirement.

Figure 7:
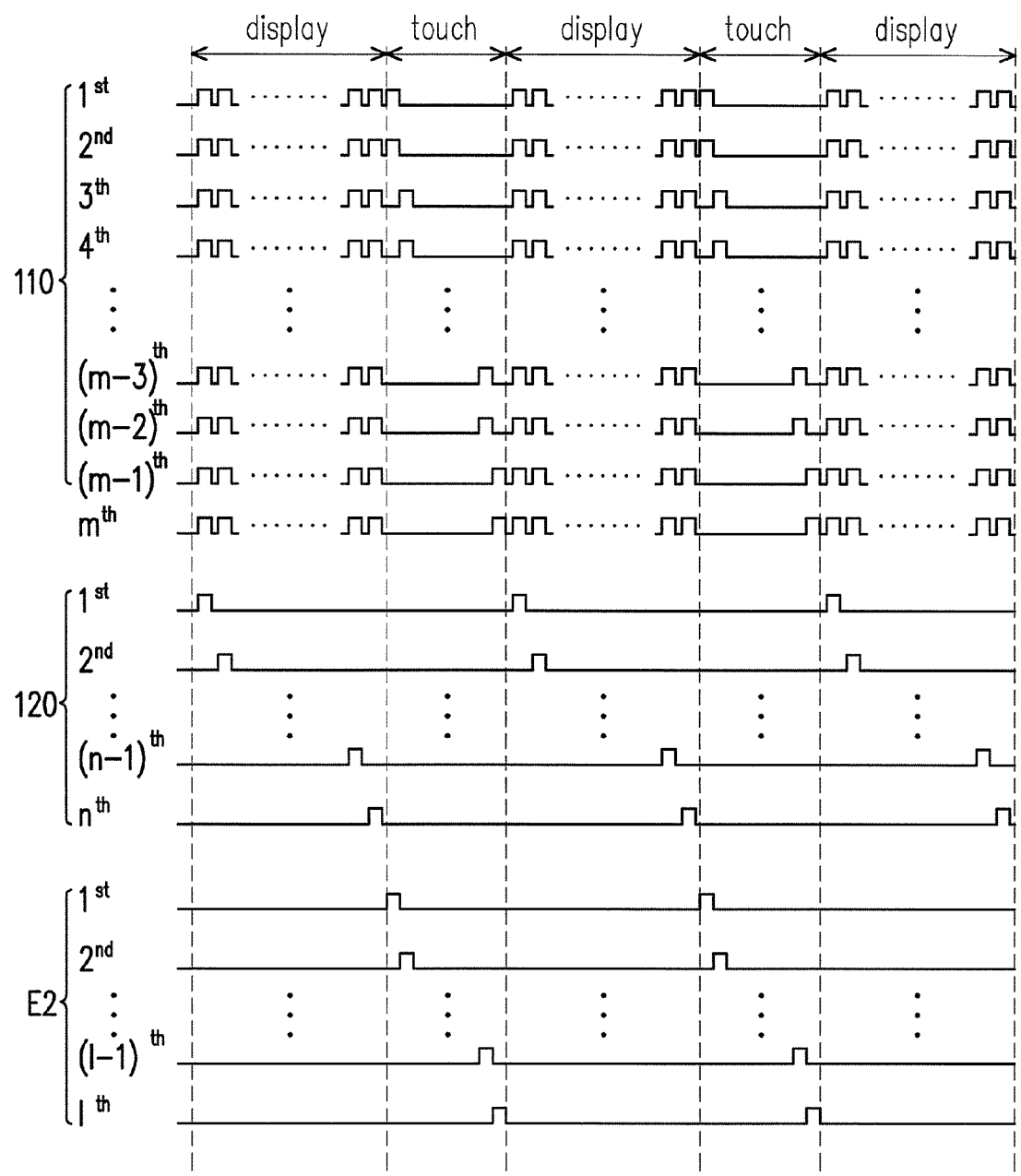
FIG. 7 is a time sequence diagram of an in-cell touch display panel according to an embodiment of the invention.

FIG. 7 is a time sequence diagram of an in-cell touch display panel according to an embodiment of the invention. FIG. 7 only schematically illustrates operating time sequences of the data lines 110, the scan lines 120, and the second touch electrodes E2, not showing the details of other components of the in-cell touch display panel 10, where 1, n and m are positive integers. Referring to FIGS. 1, 2, 5, and 7, by the structure design of the active device array substrate 100, the in-cell touch display panel 10 of the embodiment can achieve displaying and touching functions. Specifically, a display cycle and a touching cycle of the in-cell touch display panel 10 of the embodiment are not overlapped with each other. In other words, the display cycle and the touching cycle are present, for example, on the basis of time division mode.

In the display cycle, each of the scan lines 120 is sequentially enabled so as to turn on the corresponding active device 130, and each of the data signal lines 110 is also independently enabled. The signals are delivered to the corresponding pixel electrodes 140 through the sources 136, the channel layer 134 and the drains 138. At the time, all the common electrodes 150 transmit the signals through the common signal lines 170 and have a common electrical potential. Meanwhile, a lateral electrical field can be formed between the pixel electrodes 140 and the corresponding common electrodes 150 to drive display medium in the display medium layer 300 and further realize the displaying function of the in-cell touch display panel 10.

In the touching cycle, the second touch electrodes E2 are sequentially driven, in which when each of the second touch electrodes E2 is driven, all the data signal lines 110 corresponding to each of the second touch electrodes E2 are driven simultaneously. In more details, the data signal lines 110 connected to the switch 160 are electrically connected together through the same switch 160. As a result, the sensing signals can be simultaneously transmitted to the data signal lines 110 connected to the same switch 160. In other words, all the pixel electrodes 140 forming the same second touch electrodes E2 can be simultaneously enabled to have a same electrical potential. At the time, each of the second touch electrodes E2 transmits the signal through the data signal line 110. There is an insulation layer 145 located between the first touch electrode E1 and the second touch electrode E2 at the overlapping place, so that a capacitance is present in the sensing area S at the overlapping place of the first touch electrode E1 and the second touch electrode E2. When a touch event occurs, the capacitance of the touched sensing area S gets changed and the touch position can be revealed by detection, and the touching function of the in-cell touch display panel 10 is therefore achieved. Specifically, the display cycle and the touching cycle are present alternately, in which the time length of the display cycle is greater than the time length of the touching cycle.

Figure 6:
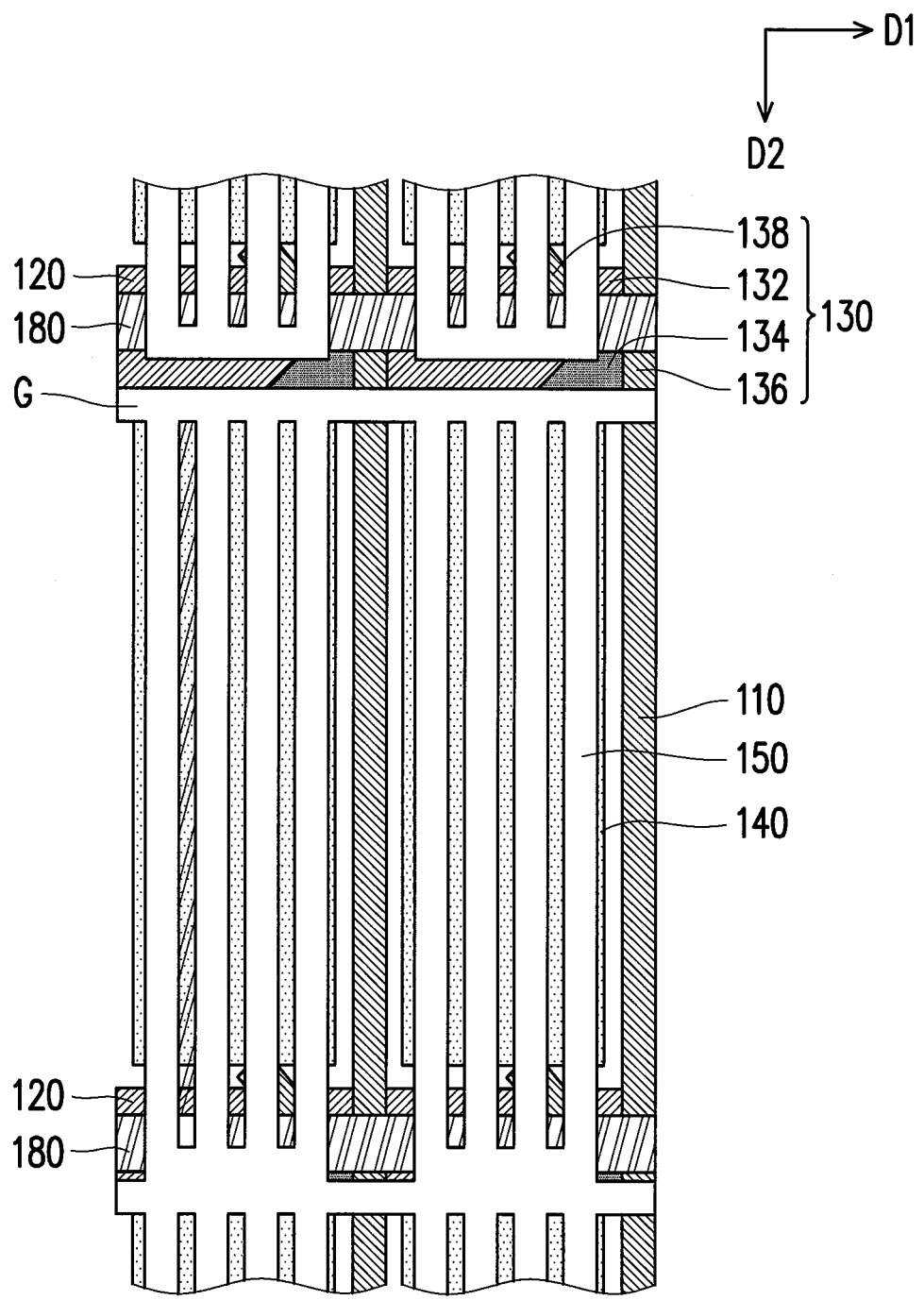
FIG. 6 is a top-view diagram of an active device array substrate according to another embodiment of the invention.

In another embodiment, the active device array substrate 100 further includes a plurality of conductive patterns 180 electrically connected to the common electrodes 150. In more details, prior to forming the common electrodes 150, a plurality of conductive patterns 180 are formed on the insulation layer 145. The conductive patterns 180 and the common electrodes 150 contact each other, as shown in FIG. 6. In the embodiment, the disposing positions of the conductive patterns 180, preferably, are corresponding to the distribution positions of the black matrix layer on the opposite substrate 200, which can reduce the probability for the user to see the conductive patterns 180. In addition, the conductive patterns 180, preferably, are made of metallic material or other conductive materials with good conductivity. In this way, the conduction impedance of the first touch electrodes E1 can be reduced and the touching sensitivity of the first touch electrodes E1 can be thereby advanced.

In summary, when the in-cell touch display panel of the invention is in the display cycle, each of the data signal lines is independently enabled so that the common electrodes and the pixel electrodes drive the display medium layer to realize the general displaying function; in the touching cycle, the data signal lines connected to the same switch are simultaneously enabled so that the pixel electrodes and the data signal lines connected to the same switch together form the second touch electrodes. The common electrodes form the first touch electrodes. A plurality of sensing areas can be formed at the overlapping place of the alternately disposed first touch electrodes and second touch electrodes. In other words, the pixel electrodes can realize the touching function through the design of the data signal lines and the switch.

What is claimed is:

1. An in-cell touch display panel, comprising:
an active device array substrate, comprising:
a substrate, having a display region and a peripheral region adjacent to the display region;
a plurality of active devices, arranged in array in the display region;
a plurality of pixel electrodes, located in the display region and respectively electrically connected to the corresponding active devices;
a plurality of common electrodes, located in the display region and disposed respectively corresponding to the pixel electrodes, wherein the common electrodes are arranged into a plurality of common electrode series and each of the common electrode series extends along a first direction, wherein every two or more common electrode series are connected to each other to form a first touch electrode so that all the common electrodes of the active device array substrate form a plurality of first touch electrodes sequentially arranged along a second direction;
a plurality of data signal lines, located in the display region and respectively coupled to the pixel electrodes through the corresponding active devices; and a plurality of switches, wherein every two or more of the data signal lines are electrically directly connected to one of the plurality of switches, wherein the pixel electrodes and their respective data signal lines are coupled to a same switch of the plurality of switches and together form a second touch electrode, wherein all the pixel electrodes and their respective data signal lines form a plurality of second touch electrodes arranged along the first direction;

an opposite substrate, opposite to the active device array substrate; and a display medium layer, disposed between the active device array substrate and the opposite substrate.

2. The in-cell touch display panel as claimed in claim 1, wherein each of the active devices comprises a gate, a channel layer, a source and a drain, each of the data signal lines is electrically connected to the source of the corresponding active device, and each of the pixel electrodes is electrically connected to the drain of the corresponding active device.

3. The in-cell touch display panel as claimed in claim 2, further comprising a plurality of scan lines disposed on the substrate, wherein the scan lines and the data signal lines are intersected to each other, wherein each of the scan lines is electrically connected to the gate of the corresponding active device.

4. The in-cell touch display panel as claimed in claim 1, further comprising a plurality of conductive patterns respectively electrically connected to the corresponding common electrodes.

5. The in-cell touch display panel as claimed in claim 1, wherein the first touch electrodes are separated from each other.

6. The in-cell touch display panel as claimed in claim 1, wherein the same switch of the plurality of switches is a circuit design with a circuit-switching function.

7. The in-cell touch display panel as claimed in claim 1, wherein the pixel electrodes are disposed below the common electrodes.

8. The in-cell touch display panel as claimed in claim 1, further comprising a plurality of common signal lines located in the peripheral region and respectively electrically connected to one of the first touch electrodes.

9. A method of driving the in-cell touch display panel as claimed in claim 1, comprising:
    independently driving each of the data signal lines in a display cycle; and
    sequentially driving the second touch electrodes in a touching cycle, wherein when each of the second touch electrodes is driven, all the data signal lines corresponding to each of the second touch electrodes are simultaneously driven,
    wherein the display cycle and the touching cycle are not overlapped with each other.

10. The method of driving the in-cell touch display panel as claimed in claim 9, wherein time length of the display cycle is greater than time length of the touching cycle.

* * * * *